United States Patent
Wei et al.

(10) Patent No.: US 12,382,143 B2
(45) Date of Patent: Aug. 5, 2025

(54) METHOD AND APPARATUS FOR MULTIMEDIA PROCESSING, AND ELECTRONIC DEVICE AND MEDIUM

(71) Applicant: BEIJING BYTEDANCE NETWORK TECHNOLOGY CO., LTD., Beijing (CN)

(72) Inventors: Zijie Wei, Beijing (CN); Fei Xie, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 110 days.

(21) Appl. No.: 17/641,790

(22) PCT Filed: Sep. 9, 2020

(86) PCT No.: PCT/CN2020/114164
§ 371 (c)(1),
(2) Date: Mar. 9, 2022

(87) PCT Pub. No.: WO2021/047534
PCT Pub. Date: Mar. 18, 2021

(65) Prior Publication Data
US 2024/0114030 A1    Apr. 4, 2024

(30) Foreign Application Priority Data

Sep. 9, 2019  (CN) .......................... 201910848764.9
Sep. 9, 2019  (CN) .......................... 201910849283.X

(51) Int. Cl.
*H04L 9/40*     (2022.01)
*H04N 21/20*    (2011.01)
*H04N 21/4788*  (2011.01)

(52) U.S. Cl.
CPC ........ *H04N 21/4788* (2013.01); *H04N 21/20* (2013.01)

(58) Field of Classification Search
CPC .... H04N 21/4788; H04N 21/20; H04N 21/41; H04N 5/147; H04N 21/2187;
(Continued)

(56) References Cited

U.S. PATENT DOCUMENTS 10,057,636 B1 *  8/2018  Nijim ................ H04N 21/4325
2014/0331289 A1  11/2014 Li et al.
(Continued)

FOREIGN PATENT DOCUMENTS

CN    104717559 A   6/2015
CN    105472409 A   4/2016
(Continued)

OTHER PUBLICATIONS

International Patent Application No. PCT/CN2020/114164; Int'l Search Report; dated Dec. 8, 2020; 2 pages.

*Primary Examiner* — Alazar Tilahun
(74) *Attorney, Agent, or Firm* — BakerHostetler

(57) ABSTRACT

A method and apparatus for multimedia processing, and an electronic device and a computer-readable medium. The method comprises: in response to detecting a transmission operation of a user on a target video, acquiring multimedia information corresponding to the target video, wherein the multimedia information carries positioning information of the target video; and in response to receiving information for executing transmission, sending the multimedia information to an application server corresponding to an application for transmitting the target video, wherein the information for executing transmission comprises identification information (Continued)

of the application. The embodiment realizes the intuitive display of the content of the target video, and reduces the consumption of traffic.

20 Claims, 10 Drawing Sheets

(58) Field of Classification Search
CPC .......... H04N 21/4882; H04N 21/4312; H04N 21/2743; H04N 21/858; H04N 21/232
See application file for complete search history.

(56) References Cited

U.S. PATENT DOCUMENTS

| | | | | |
|---|---|---|---|---|
| 2016/0246452 A1* | 8/2016 | Bockhold | ............ | G06F 3/0482 |
| 2020/0007939 A1* | 1/2020 | Tang | ................. | H04N 21/4788 |
| 2021/0006867 A1* | 1/2021 | Liu | ................... | H04N 21/4316 |

FOREIGN PATENT DOCUMENTS

| | | | |
|---|---|---|---|
| CN | 105847993 | A | 8/2016 |
| CN | 105898456 | A | 8/2016 |
| CN | 105898520 | A | 8/2016 |
| CN | 106231355 | A | 12/2016 |
| CN | 106254467 | A | 12/2016 |
| CN | 107770574 | A | 3/2018 |
| CN | 109062930 | A | 12/2018 |
| CN | 109451343 | A | 3/2019 |
| CN | 109511010 | A | 3/2019 |
| CN | 110098995 | A | 8/2019 |

\* cited by examiner

METHOD AND APPARATUS FOR MULTIMEDIA PROCESSING, AND ELECTRONIC DEVICE AND MEDIUM

CROSS REFERENCE TO RELATED APPLICATIONS

This application is the U.S. National Stage of International Application No. PCT/CN2020/114164, filed on Sep. 9, 2020, which claims priorities to Chinese Patent Application No. 201910848764.9 filed on Sep. 9, 2019 and entitled "METHOD AND APPARATUS FOR TRANSMITTING VIDEO INFORMATION, ELECTRONIC DEVICE AND MEDIUM", and Chinese Patent Application No. 201910849283.X filed on Sep. 9, 2019 and entitled "VIDEO PROCESSING METHOD AND APPARATUS, ELECTRONIC DEVICE AND COMPUTER-READABLE MEDIUM", the contents of which are incorporated by reference herein in their entireties as part of this application.

FIELD

Embodiments of the present disclosure relate to the technical field of computers, specifically to a method and apparatus for multimedia processing, an electronic device and a computer-readable medium.

BACKGROUND

The popularization of electronic devices represented by smart phones has greatly changed people's lifestyle. For example, electronic devices are used for video transmission, playback, and other processing. In the process of processing multimedia information such as video information, there are a series of problems that need to be solved.

SUMMARY

Embodiments of the present disclosure provide a method and apparatus for multimedia processing, an electronic device and a computer-readable medium.

In the first aspect, some embodiments of the disclosure provide a method for multimedia processing, comprising: acquiring a first multimedia information corresponding to a target multimedia in response to detecting a processing operation of a user for the target multimedia, the first multimedia information carries a positioning information of the target multimedia; and sending the first multimedia information to an application server corresponding to an application used for processing the target multimedia in response to receiving information used for executing the multimedia processing, wherein the information used for executing the multimedia processing comprises identification information of the application.

In the second aspect, some embodiments of the disclosure provide a method for multimedia processing, comprising: acquiring a multimedia information corresponding to a target multimedia in response to receiving a processing request sent by a first terminal for the target multimedia; adding a positioning information of the target multimedia to the multimedia information to obtain a first multimedia information corresponding to the target multimedia; and sending the first multimedia information to the first terminal.

In the third aspect, some embodiments of the disclosure provide a method for multimedia processing, comprising: acquiring a first multimedia information corresponding to a target multimedia in response to receiving a processing request for the target multimedia, wherein the processing request comprises identification information of an application used for processing the target multimedia, and the first multimedia information carries a positioning information of the target multimedia; and sending the first multimedia information to an application server corresponding to the application, wherein the application server distributes the target multimedia based on the first multimedia information.

In the fourth aspect, some embodiments of the disclosure provide an apparatus for multimedia processing, comprising: an acquisition unit configured to acquire a first multimedia information corresponding to a target multimedia in response to detecting a processing operation of a user for the target multimedia, the first multimedia information carries a positioning information of the target multimedia; and a sending unit configured to send the first multimedia information to an application server corresponding to an application used for processing the target multimedia in response to receiving an information used for executing the processing, wherein the information used for executing the processing comprises an identification information of the application.

In the fifth aspect, some embodiments of the disclosure provide an apparatus for multimedia processing, comprising: an acquisition unit configured to acquire a multimedia information corresponding to a target multimedia in response to receiving a processing request sent by a first terminal for the target multimedia; an adding unit configured to add a positioning information of the target multimedia to the multimedia information to obtain a first multimedia information corresponding to the target multimedia; and a sending unit configured to send the first multimedia information to the first terminal.

In the sixth aspect, some embodiments of the disclosure provide an apparatus for multimedia processing, comprising: an acquisition unit configured to acquire a first multimedia information corresponding to a target multimedia in response to receiving a processing request for the target multimedia, wherein the processing request comprises an identification information of an application used for processing the target multimedia, and the first multimedia information carries a positioning information of the target multimedia; and a sending unit configured to send the first multimedia information to an application server corresponding to the application, wherein the application server distributes the target multimedia based on the first multimedia information.

In the seventh aspect, some embodiments of the disclosure provide a method for multimedia processing, comprising: reading an element, satisfying a preset condition, in a target element set, the element is a multimedia information; recognizing the element to obtain a positioning information of a target multimedia contained in the element; and processing the target multimedia based on the positioning information.

In the eighth aspect, some embodiments of the disclosure provide an apparatus for multimedia processing, comprising: a reading unit configured to read an element, satisfying a preset condition, in a target element set, the element is a multimedia information; a recognition unit configured to recognize the element to obtain a positioning information of the target multimedia contained in the element; and a processing unit configured to process the target multimedia based on the positioning information.

In the ninth aspect, some embodiments of the disclosure provide an electronic device, comprising: one or more processors; and a storage apparatus storing one or more programs, wherein when the one or more programs are executed by the one or more processors, the one or more processors are caused to implement the method according to any one of the first aspect, or the method according to the second aspect, or the method according to any one of the third aspect, or the method according to any one of the seventh aspect.

In the tenth aspect, some embodiments of the disclosure provide a computer-readable medium, comprising: which stores a computer program, wherein the program, when executed by a processor, implements the method according to any one of the first aspect, or the method according to the second aspect, or the method according to any one of the third aspect, or the method according to any one of the seventh aspect.

According to the method and apparatus for multimedia processing, the electronic device and the computer-readable medium provided by some embodiments of the present disclosure, in response to detecting a processing operation of a user for target multimedia, first multimedia information corresponding to the target multimedia is acquired; and in response to receiving information used for executing processing, the first multimedia information is sent to an application server corresponding to an application used for transmitting the target multimedia. Since the first multimedia information and the target multimedia have a corresponding relationship, the content of the target multimedia can be displayed visually, which enriches the form of multimedia processing. In addition, compared with direct sending of the target multimedia, this method has the advantage that since the first multimedia information corresponding to the target multimedia is generally smaller than a target video, the consumption of traffic can be reduced in the process of sending the first multimedia information to the application server.

In addition, an element, satisfying a preset condition, in a target element set is read, and the element is a multimedia information. On this basis, the element is recognized to obtain positioning information of the target multimedia contained in the element. Afterwards, the target multimedia is processed based on the positioning information. In this process, the positioning information of the target multimedia is obtained by automatically recognizing the element, thereby achieving multimedia processing based on the multimedia information and improving the information processing efficiency.

BRIEF DESCRIPTION OF THE DRAWINGS

Other features, objectives, and advantages of the present disclosure will become more apparent by reading the detailed descriptions made to the non-limiting embodiments with reference to the following drawings.

DETAILED DESCRIPTION OF THE EMBODIMENTS

The present disclosure will be further described in detail below in conjunction with the accompanying drawings and embodiments. It can be understood that specific embodiments described herein are merely intended to explain relevant disclosure, rather than to limit the present disclosure. In addition, it should be further noted that parts relevant to the relevant disclosure are merely shown in the accompanying drawings in order to facilitate description.

It should be noted that the embodiments in the present disclosure and features in the embodiments can be combined with each other without conflicts. The present disclosure will be described in detail below with reference to the accompanying drawings and in conjunction with the embodiments. In addition, in the embodiments of the present disclosure, the multimedia data used for transmission or processing may include, but not limited to, video data, audio data, photo data, and the like.

Figure 1:
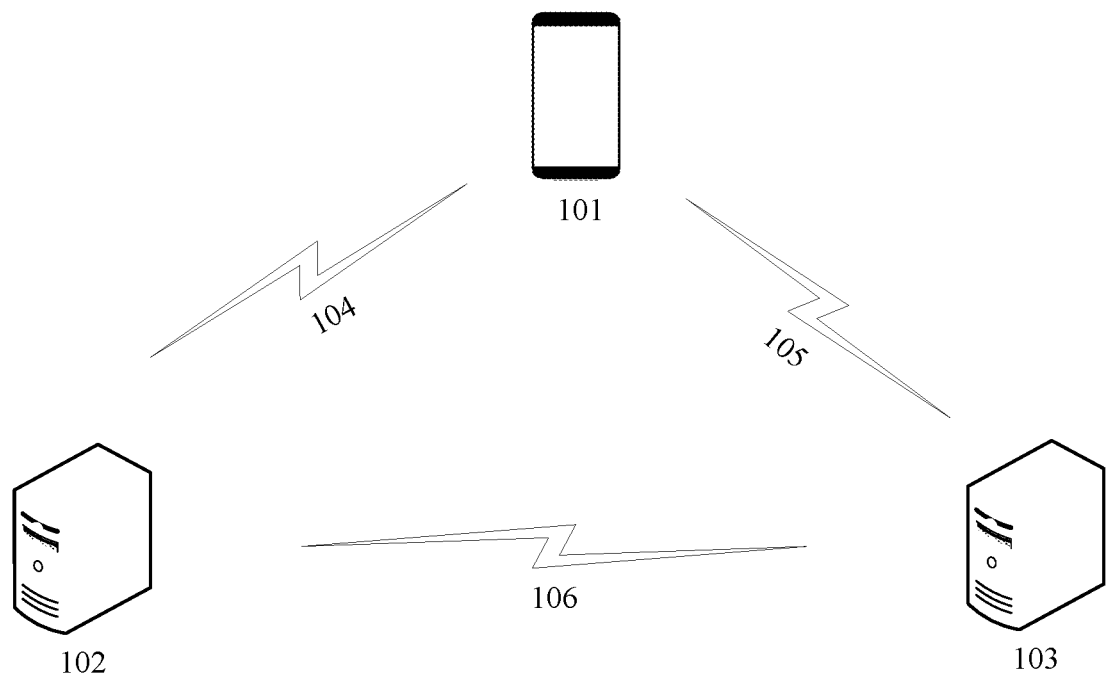
FIG. 1 is an architecture diagram of an exemplary system in which some embodiments of the present disclosure can be applied.

FIG. 1 shows an exemplary architecture 100 capable of applying an embodiment of a method or device for transmitting video information in the present disclosure.

As shown in FIG. 1, the system architecture 100 may include terminal device 101, servers 102 and 103 and networks 104, 105, 106. The network 104 is a medium used to provide a communication link between the terminal device 101 and the server 102. Similarly, the network 105 is a medium used to provide a communication link between the terminal device 101 and the server 103. The network 106 is the medium used to provide a communication link between servers 102 and 103. The networks 104, 105, 106 may comprise various connection manners such as a wired communication link, a wireless communication link or an optical cable.

The terminal device 101 can interact with the server 102 through the network 104 and interact with the server 103 through the network 105 to receive or send messages and the like. Various client applications may be installed on the terminal device 101, such as video applications, communication applications, and the like.

The terminal device 101 may be hardware or software. When being the hardware, the terminal device 101 may be various electronic device having display screen and supporting video display, including, but not limited to a smart phone, a tablet computer, an electronic book reader, a portable laptop computer and a desk computer. When being the software, the terminal device 101 may be installed in the electronic device listed as above. The terminal device 101 may be implemented as a plurality of software or hardware modules (such as a plurality of software or software modules for providing distributed service) or implemented as a single software or software module, which is not specifically limited herein.

The server 102 may be a server that provides various services, for example, an application server that provides support for communication applications installed on the terminal device 101. According to actual needs, as an example, the application server may store or distribute the received multimedia information. There is no specific limitation here.

The server 103 may also be a server that provides various services, for example, a video server that provides support for video applications installed on the terminal device 101. According to actual needs, as an example, the video server may send the corresponding video to the terminal device 101 in response to the video viewing request.

It should be noted that, the method for video information transmission (applied to the first terminal) provided by the embodiments of the present disclosure is generally executed by the terminal device 101. Correspondingly, the apparatus for video information transmission (applied to the first terminal) may be provided in the terminal device 101. The method for video information transmission (applied to the video server) provided by the embodiments of the present disclosure is generally executed by the server 103. Correspondingly, the apparatus for video information transmission (applied to the video server) may be provided in the server 103.

It should be noted that the server may be hardware or software. When being the hardware, the server may be implemented as a distributed server cluster composed of a plurality of servers or implemented as a single server. When being the software, the server may be implemented as a plurality of software or software modules (such as a plurality of software or software modules for providing distributed service) or implemented as a single software or software module, which is not specifically limited herein.

It should be understood that the numbers of the terminal device, network and the server in FIG. 1 are merely illustrative. There may be any number of terminal device, network and servers according to an implementation demand.

Figure 2:
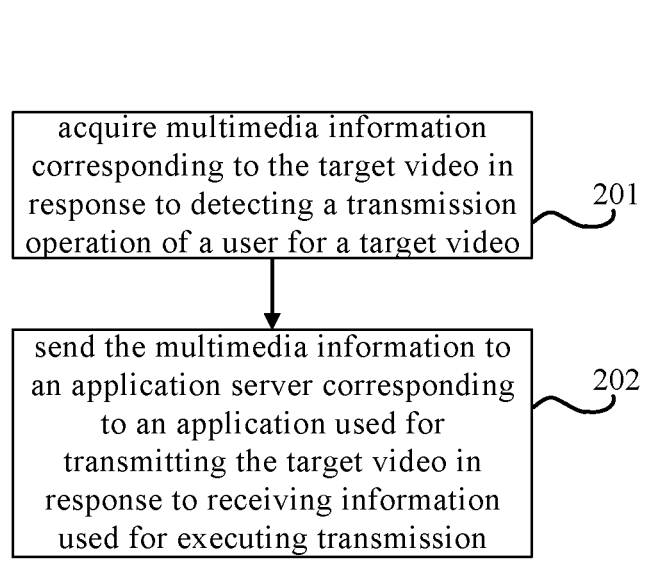
FIG. 2 is a flowchart of some embodiments of a method for transmitting video information according to the present disclosure.

Continuing to refer to FIG. 2, a flow 200 of some embodiments of a method for transmitting video information according to the present disclosure is illustrated. The method for transmitting the video information is applied to a first terminal. The video information may include multimedia information corresponding to a target video. The method includes the following steps:

Step 201, acquiring, in response to detecting a transmission operation of a user for a target video, multimedia information corresponding to the target video.

In some embodiments, an execution subject of the method for transmitting video information may be a first terminal (for example, a terminal device 101 shown in FIG. 1). In practice, the execution subject can detect the transmission operation of the user in various ways. The transmission operation may be various types of operations in a transmission process, including but not limited to a share operation, an upload operation, a server-side backup operation, and the like. For example, the transmission operation may be realized through clicking, sliding, and other operations of the user according to an implementation need. Some operating systems provide a monitoring function for a clicking event, an operating event, and other events, so that the detection of the transmission operation can be realized by calling a related class. For another example, the transmission operation may also be inputting, by the user, a voice. The execution subject can detect, through voice recognition, whether the voice input by the user includes a keyword, such as "upload", so as to detect the transmission operation of the user.

In some embodiments, the target video may be any video. The target video may be designated or may be screened through certain conditions. For example, a video that the user is currently watching may be determined as the target video. For another example, a video that is operated by the user may be determined as the target video.

It should be noted that "first" in the first terminal is only for the convenience to distinguish different terminals involved in the present disclosure, and no limitation is made to the terminal.

In some embodiments, in response to detecting the transmission operation of the user for the target video, the above-mentioned execution subject can acquire the multimedia information corresponding to the target video.

The multimedia information may be information including two or more media, including but not limited to: image, character, video, audio, and the like. Generally, the multimedia information corresponding to the target video may be multimedia information associated with the target video according to an actual need. As an example, the multimedia information may be generated based on the target video. For example, 15 seconds of video are cut from the target video as the multimedia information corresponding to the target video. For another example, a preset frame is cut from the target video to form the corresponding multimedia information. This corresponding relationship or association relationship enhances the relevance between the multimedia information and the target video, which contributes to visually displaying the target video and enriches the form of video transmission. As an example, the multimedia information may also be associated with but not overlap with the target video in content, or the overlap degree satisfies a predetermined condition. For example, the target video and the multimedia information may be different clips cut from the same video, or two videos with the same topics. The multimedia information carries positioning information of the target video, which contributes to subsequently processing the target video by means of the positioning information.

As an example, the multimedia information corresponding to the target video may be stored on the above execution subject locally. At this time, the above execution subject can locally directly read the multimedia information corresponding to the target video.

In some alternative implementations, the multimedia information corresponding to the target video can also be acquired by the following methods:

sending, in response to detecting the transmission operation of the user for the target video, a video transmission request to a video server in communication connection; and receiving the multimedia information corresponding to the target video issued by the video server in response to the video transmission request. The multimedia information corresponding to the target video may be pre-generated by the video server, or is generated in response to receiving the video transmission request sent by the first terminal.

Step 202, sending, in response to receiving information used for executing transmission, the multimedia information to an application server corresponding to an application used for transmitting the target video.

In some embodiments, the information used for executing the transmission may include identification information of the application used for transmitting the target video. Thus, the above execution subject can send the multimedia information to the application server (such as a server 102 shown in FIG. 1) corresponding to the above application. The application server can store or distribute the received multimedia information according to an actual need.

It should be noted that in the present disclosure, the expression "the application used for transmitting the target video" is only used for expressing a potential function of the application or a potential intention of the user, and is not intended to make any limitation to the effect achieved by the application in the present disclosure. In addition, it can be known from the above that the multimedia information corresponding to the target video is actually sent to the application server, but not the target video itself.

In practice, the application server can store, distribute, or process, in other ways, the received multimedia information according to an actual need.

In some alternative implementations, the information used for executing the transmission further includes identification information of a target user; and sending the multimedia information to the application server corresponding to the application used for transmitting the target video includes: sending the multimedia information and the identification information of the target user to the application server corresponding to the application used for transmitting the target video. The identification information of the target user is used for instructing the application server to send the multimedia information to a second terminal corresponding to the target user, so that the second terminal processes the target video based on the positioning information, thereby achieving directed distribution of the multimedia information.

In some alternative implementation mode, the method further includes: sending, by the application server, the multimedia information to the second terminal corresponding to the target user. On this basis, the second terminal can process the target video in various ways based on the positioning information. For example, the target video can be played, downloaded, and the like based on the positioning information, thereby sharing of the target video from the first terminal to the second terminal is achieved, which enriches the video sharing mode. In this process, the user can have a preliminary understanding of the target video through multimedia information, so that the accuracy of information transmission can be improved and waste of network resources is avoided.

In these implementations, directed transmission of multimedia information can be realized by sending the identification information of the target user to the application server.

Figure 3:
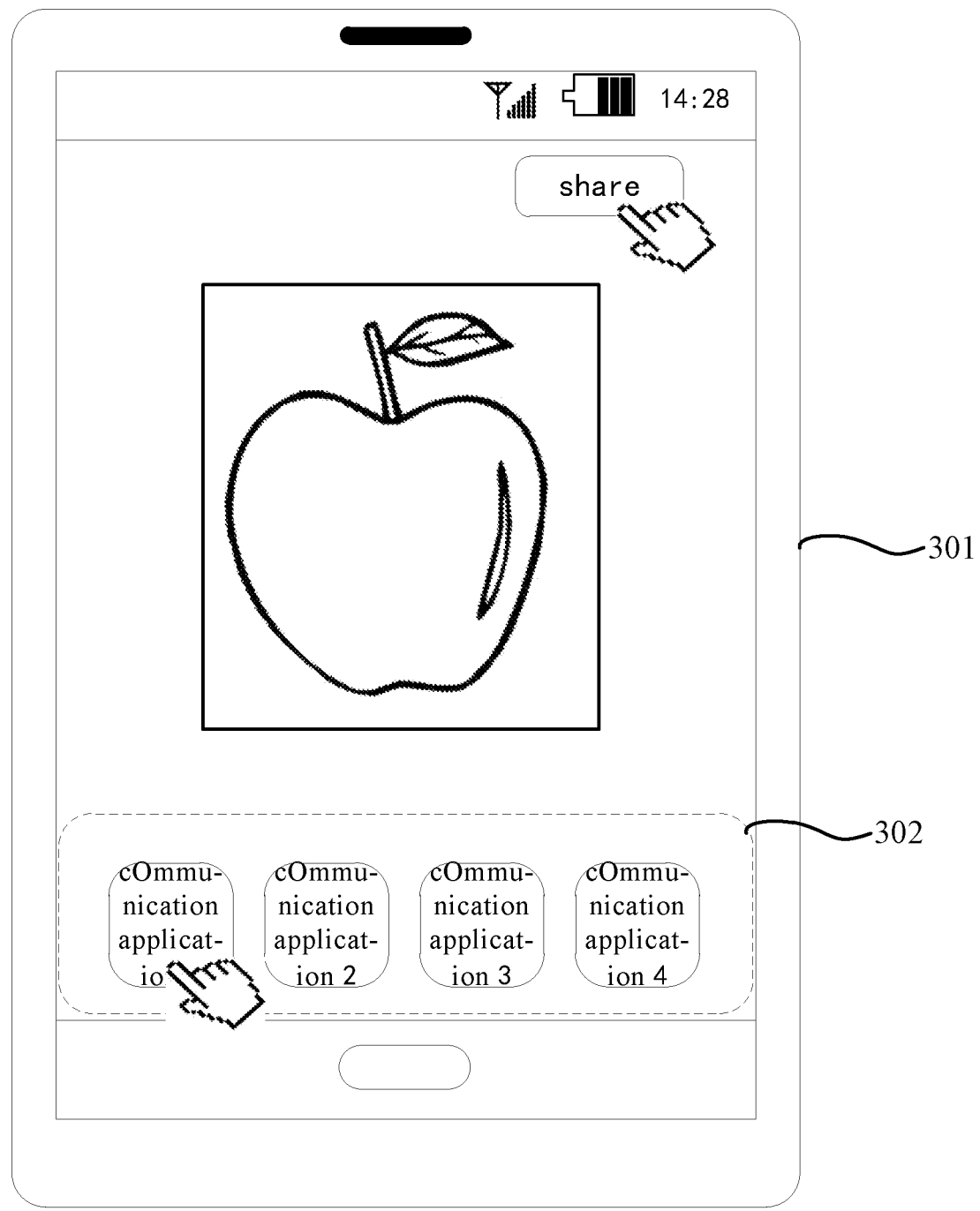
FIG. 3 is a schematic diagram of an application scenario of a method for transmitting video information according to some embodiments of the present disclosure.

Continuing to refer to FIG. 3, FIG. 3 is a schematic diagram of an application scenario of a method (applied to a first terminal) for transmitting video information according to some embodiments of the present disclosure. In the application scenario of FIG. 3, a user can click a "share" button when there is splendid video A while watching a video using a smart phone 301. In this application scenario, a transmission operation may be a sharing operation. The smart phone 301 can acquire multimedia information corresponding to the video A locally or from a video server in response to detecting the transmission operation of the user for video A, i.e., the above operation of clicking the "share" button. Afterwards, the user can spontaneously or be guided to input information used for executing the transmission, that is, share relevant information. The information used for executing the transmission may include identification information of an application used for sharing video A. As an example, as shown in 302 of FIG. 3, icons of a plurality of communication applications may be displayed to guide the user to select the application for sharing video A. That is, the identification information of the application is input by clicking the icon of the application. As an example, the user can click the icon of communication application 1, so that the smart phone 301 can send multimedia information to an application server corresponding to communication application 1.

On this basis, alternatively, the application server can store, distribute, and process, in other ways, the multimedia information. On this basis, as an example, further, the user can select a display space corresponding to the user in communication application 1 for displaying. Therefore, in response to a request of a target user for acquiring the content in the display space, the application server can push the above-mentioned multimedia information to a terminal corresponding to the target user. The terminal here may be the first terminal according to an actual need, or may be a terminal corresponding to other users (for example, users in the friend list of the user), which is not limited in this application.

According to the method for transmitting the video information provided by some embodiments of the present disclosure, in response to detecting the transmission operation of the user for the target video, the multimedia information corresponding to the target video is acquired; and in response to receiving the information used for executing the transmission, the multimedia information is sent to the application server corresponding to the application used for transmitting the target video. Since the multimedia information and the target video have a corresponding relationship, the content of the target video can be displayed visually, which enriches the form of video transmission. In addition, compared with direct sending of the target video, this method has the advantage that since the multimedia information corresponding to the target video is generally smaller than the target video, the consumption of traffic can be reduced in the process of sending the multimedia information to the application server.

In some alternative implementations, acquiring, in response to detecting the transmission operation of the user for the target video, the multimedia information corresponding to the target video includes: sending, in response to detecting the transmission operation of the user for the target video, a video transmission request to a video server in communication connection; receiving a video or an image corresponding to the target video issued by the video server in response to the video transmission request; and adding positioning information of the target video to the received video or image to obtain multimedia information corresponding to the target video.

The positioning information of the target video can be added in various forms, including but not limited to a graphic code, a digital code, a character string, and the like. The graphic code may be a bar code, a QR code, and the like. Taking the graphic code as an example, the graphic code may contain the positioning information of the target video. Therefore, after the multimedia information is sent to the application server, the positioning information of the target video can be obtained by recognizing the graphic code, and then the target video can be played or the like. Therefore, the transmission of the multimedia information corresponding to the target video is achieved, and the complete transmission of the target video is further achieved.

Figure 4:
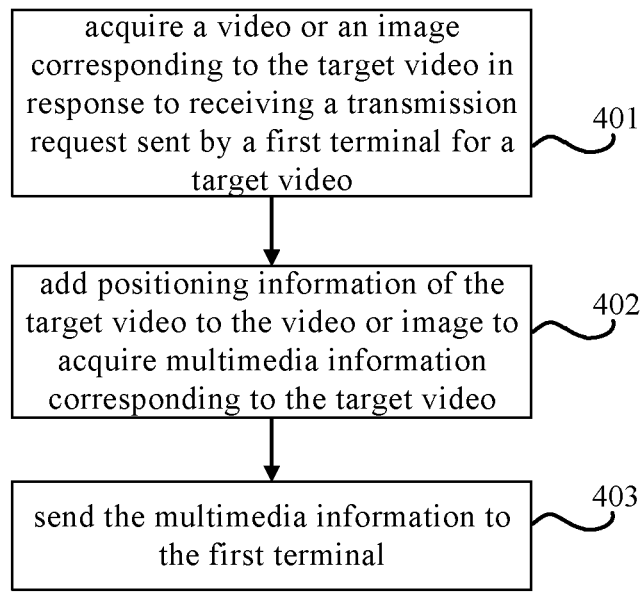
FIG. 4 is a flowchart of some other embodiments of a method for transmitting video information according to the present disclosure.

Continuing to refer to FIG. 4, a flow 400 of some other embodiments of a method for transmitting video information according to the present disclosure is illustrated. The method for transmitting video information is applied to a video server and includes the following steps:

Step 401, acquiring, in response to receiving a transmission request sent by a first terminal for a target video, a video or an image corresponding to the target video.

In some embodiments, an execution subject of the method for transmitting the video information may be a video server (such as a server 103 shown in FIG. 1). In response to receiving the transmission request sent by the first terminal (such as a terminal device 101 shown in FIG. 1) for the target video, the above-mentioned execution subject may acquire the video or the image corresponding to the target video in a variety of ways. In practice, as an example, the transmission request may contain identification information of the target video, so the above-mentioned execution subject can directly and locally search for the video or image corresponding to the identification information. Of course, the video or image corresponding to the target video can also be acquired from other electronic devices in communication connection. Generally, the video or image corresponding to the target video may be a video or image that has an association relationship with the target video. As an example, the video or image may be generated based on the target video. For example, a fixed-duration video may be cut from the target video as a video corresponding to the target video. For another example, a certain frame of image in the target video can also be used as the corresponding image. As an example, the video or image may also be associated with but not overlap with the target video in content, or the overlap degree satisfies a predetermined condition. For example, the target video and the corresponding video may be different clips cut from the same video, or two videos with the same topics.

Step 402, adding positioning information of the target video to the video or image to acquire multimedia information corresponding to the target video.

In some embodiments, on the basis of step 401, the above execution subject may add the positioning information of the target video to the video or image, thereby obtaining multimedia information corresponding to the target video. The positioning information of the target video may be added in various forms, including but not limited to a graphic code, a digital code, a character string, and the like. The graphic code may be a bar code, a QR code, and the like. Taking the graphic code as an example, the graphic code may contain the positioning information of the target video. The positioning information of the target video may be information used for indicating a storage position of the target video. In practice, a graphic code containing the positioning information of the target video may be generated by means of an existing graphic code generator. On this basis, for the image, the graphic code may be added to the image by using various kinds of image processing applications or methods, while for the video, the video may be first parsed into a frame sequence, and then the above execution subject may add the graphic code to one or more frames of images in the frame sequence according to an actual need. No specific limitation is made here.

Step 403, sending the multimedia information to the first terminal.

In some embodiments, the above execution subject may send the obtained multimedia information to the first terminal.

In some embodiments, the graphic code further includes at least one of the following: a device code of the first terminal, and buried point information. Adding the device code of the first terminal is convenient for distinguishing contents shared by different terminals. In addition, the multimedia information can be tracked by adding the buried point information.

The method for transmitting the video information provided by some embodiments of the present disclosure is applied to the video server. The positioning information of the target video is added to the video or image to obtain the multimedia information corresponding to the target video. On this basis, the first terminal can transmit the multimedia information. Therefore, a device that receives the multimedia information can obtain the positioning information of the target video from the multimedia information and then play the target video or process the target video in other ways.

Figure 5:
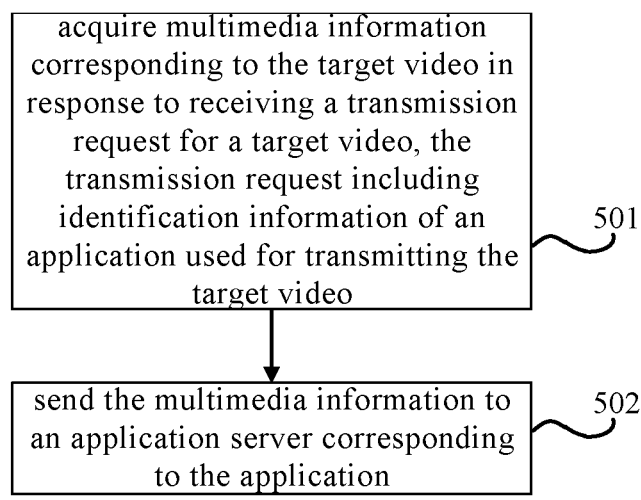
FIG. 5 is a flowchart of yet some other embodiments of a method for transmitting video information according to the present disclosure.

Further referring to FIG. 5, a flow 500 of yet some other embodiments of a method for transmitting video information according to the present disclosure is illustrated. The method for transmitting the video information is applied to a video server and includes the following steps:

Step 501, acquiring, in response to receiving a transmission request for a target video, multimedia information corresponding to the target video, the transmission request includes identification information of an application used for transmitting the target video.

In some embodiments, an execution subject of the method for transmitting the video information may be a video server (such as a server 103 shown in FIG. 1). In response to receiving the transmission request for the target video, the above execution subject can acquire the multimedia information corresponding to the target video. The target video may be any video. The target video may be designated or may be screened through certain conditions. For example, the transmission request may include video identification information. At this time, a video characterized by the video identification information may be determined as the target video. The multimedia information corresponding to the target video may be diverse, including but not limited to: an image, a video, an audio, and the like. The multimedia information carries positioning information of the target video.

The above execution subject can acquire the multimedia information corresponding to the target video in a variety of ways according to an implementation need. For example, the pre-stored or generated multimedia information may be locally searched by means of the above video identification information, thus obtaining the multimedia information corresponding to the target video. Of course, the corresponding multimedia information may also be acquired from other electronic devices in communication connection.

In some alternative implementations, acquiring the multimedia information corresponding to the target video includes: acquiring a video or an image corresponding to the target video; and adding positioning information of the target video to the video or image to obtain the multimedia information corresponding to the target video. The positioning information of the target video can have various forms, including but not limited to a graphic code, a digital code, a character string, and the like. Taking the graphic code as an example, the graphic code contains the positioning information of the target video, which is convenient for subsequently recognizing the graphic code to obtain the positioning information of the target video, and the target video can be then played or processed in other ways. The specific implementation of adding the positioning information to the video or image may refer to the description in step 402, and repeated descriptions will be omitted here.

In some alternative implementations, the multimedia information corresponding to the target video is pre-generated through the following steps: acquiring a video or an image corresponding to the target video; and adding positioning information of the target video to the video or image to obtain the multimedia information corresponding to the target video.

Step 502, sending the multimedia information to an application server corresponding to an application.

In some embodiments, the above execution subject can send the multimedia information to the application server corresponding to the application according to the identification information of the application used for transmitting the target video included in the transmission request.

In some alternative implementations, the transmission request further includes identification information of a target user; and sending the multimedia information to an application server corresponding to an application includes: sending the multimedia information and the identification information of the target user to the application server corresponding to the application. The identification information is used for instructing the application server to send the multimedia information to a second terminal corresponding to the target user.

In some alternative implementation mode, the method further includes: sending, by the application server, the multimedia information to the second terminal corresponding to the target user.

In these implementations, directed transmission of multimedia information can be realized by sending the identification information of the target user to the application server.

Compared with the descriptions of some embodiments corresponding to FIGS. 2-4, the embodiment corresponding to FIG. 5 directly sends the multimedia information to the application server through the video server, without forwarding the multimedia information through a terminal, thereby further achieving convenient and quick transmission.

Figure 6:
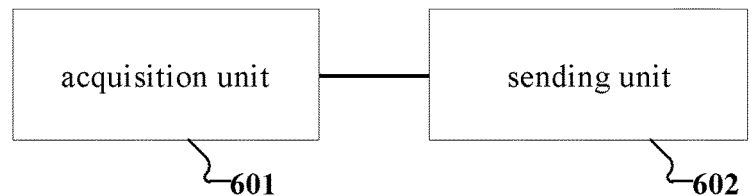
FIG. 6 is a structural schematic diagram of some embodiments of an apparatus for transmitting video information according to the present disclosure.

Continuing to refer to FIG. 6, as an implementation of the method shown in FIG. 2, the present disclosure provides some embodiments of an apparatus for transmitting video information. These apparatus embodiments correspond to those method embodiments shown in FIG. 2. The apparatus may be specifically applied to a variety of electronic devices.

As shown in FIG. 6, an apparatus 600 for transmitting video information of some embodiments is applied to a first terminal, and includes: an acquisition unit 601 configured to acquire, in response to detecting a transmission operation of a user for a target video, multimedia information corresponding to the target video, the multimedia information carrying positioning information of the target video; and a sending unit 602 configured to send, in response to receiving information used for executing the transmission, the multimedia information to an application server corresponding to an application used for transmitting the target video, the information used for executing the transmission including identification information of the application.

In some embodiments, the information used for executing the transmission includes identification information of a target user; and sending the multimedia information to an application server corresponding to an application used for transmitting the target video includes: sending the multimedia information and the identification information of the target user to the application server corresponding to the application used for transmitting the target video. The identification information of the target user is used for instructing the application server to send the multimedia information to a second terminal corresponding to the target user, so that the second terminal can process the target video based on the positioning information.

In some embodiments, the method further includes: sending, by the application server, the multimedia information to the second terminal corresponding to the target user.

In some embodiments, acquiring, in response to detecting the transmission operation of the user for the target video, the multimedia information corresponding to the target video includes: sending, in response to detecting the transmission operation of the user for the target video, a video transmission request to a video server in communication connection; and receiving the multimedia information corresponding to the target video issued by the video server in response to the video transmission request, wherein the multimedia information corresponding to the target video is pre-generated by the video server or is generated in response to receiving the video transmission request sent by the first terminal.

In some embodiments, acquiring, in response to detecting the transmission operation of the user for the target video, the multimedia information corresponding to the target video includes: sending, in response to detecting the transmission operation of the user for the target video, a video transmission request to a video server in communication connection; receiving a video or an image corresponding to the target video issued by the video server in response to the video transmission request; and adding positioning information of the target video to the received video or image to obtain the multimedia information corresponding to the target video.

In these embodiments, the specific implementations for the acquisition unit 601 and the sending unit 602 in the apparatus 600 used for transmitting the video information and technical effects achieved by the specific implementations may refer to the embodiments corresponding to FIG. 2. Descriptions thereof are omitted here.

In these embodiments, since the multimedia information and the target video have a corresponding relationship, the content of the target video can be displayed visually, which enriches the form of video transmission. In addition, compared with direct sending of the target video, this method has the advantage that since the multimedia information corresponding to the target video is generally smaller than the target video, the consumption of traffic can be reduced in the process of sending the multimedia information to the application server.

Figure 7:
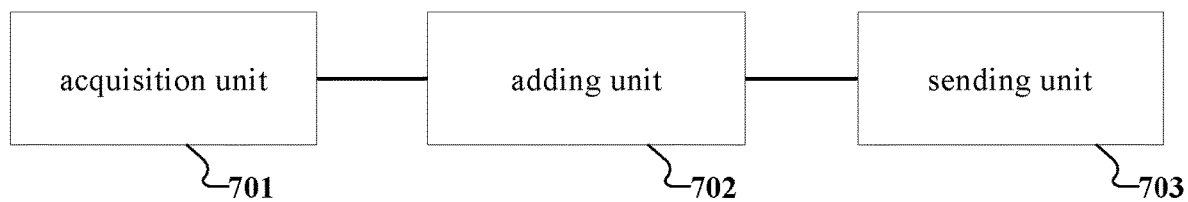
FIG. 7 is a structural schematic diagram of some other embodiments of an apparatus for transmitting video information according to the present disclosure.

Continuing to refer to FIG. 7, as an implementation of the method shown in FIG. 4, the present disclosure provides some other embodiments of an apparatus for transmitting video information. These apparatus embodiments correspond to those method embodiments shown in FIG. 4. The apparatus may be specifically applied to a variety of electronic devices.

As shown in FIG. 7, an apparatus 700 used for transmitting video information of some embodiments is applied to a video server, and includes: an acquisition unit 701 configured to acquire, in response to receiving a share request sent by a first terminal for a target video, a video or an image corresponding to the target video; an adding unit 702 configured to add positioning information of the target video to the video or image to obtain multimedia information corresponding to the target video; and a sending unit 703 configured to send the multimedia information to the first terminal.

In these embodiments, the specific implementations for the acquisition unit 701, the adding unit 702, and the sending unit 703 in the apparatus 700 used for transmitting the video information and technical effects achieved by the specific implementations may refer to the embodiments corresponding to FIG. 4. Descriptions thereof are omitted here.

In these embodiments, the corresponding multimedia information is obtained by adding the positioning information of the target video to the video or image. On this basis, the first terminal can share the multimedia information or transmit the multimedia information in other ways. Therefore, a device that receives the multimedia information can obtain the positioning information of the target video from the multimedia information and then play the target video or process the target video in other ways.

Figure 8:
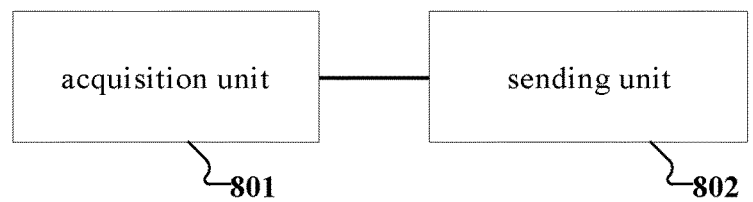
FIG. 8 is a structural schematic diagram of yet some other embodiments of an apparatus for transmitting video information according to the present disclosure.

Continuing to refer to FIG. 8, as an implementation of the method shown in FIG. 5, the present disclosure provides yet some other embodiments of an apparatus for transmitting video information. These apparatus embodiments correspond to those method embodiments shown in FIG. 5. The apparatus may be specifically applied to a variety of electronic devices.

As shown in FIG. 8, an apparatus 800 for transmitting video information of some embodiments is applied to a video server, and includes: an acquisition unit 801 configured to acquire, in response to receiving a transmission request for a target video, multimedia information corresponding to the target video, the transmission request includes identification information of an application used for transmitting the target video, and the multimedia information carry positioning information of the target video; and a sending unit 802 configured to send the multimedia information to an application server corresponding to the application, the application server distributes the target video based on the multimedia information.

In some alternative implementations, the transmission request further includes identification information of a target user; and the sending unit 802 is further configured to send the multimedia information and the identification information of the target user to the application server corresponding to the application. The identification information is used for instructing the application server to send the multimedia information to a second terminal corresponding to the target user.

In some alternative implementations, the acquisition unit 801 is further configured to acquire a video or an image corresponding to the target video, and add positioning information of the target video to the video or image to obtain the multimedia information corresponding to the target video.

In some alternative implementations, the multimedia information corresponding to the target video is pre-generated by the following steps: acquiring a video or an image corresponding to the target video; and adding positioning information of the target video to the video or image to obtain the multimedia information corresponding to the target video.

In some alternative implementations, the multimedia information corresponding to the target video is generated based on the target video.

In these embodiments, the specific implementations for the acquisition unit 801 and the sending unit 802 in the apparatus 800 used for transmitting the video information and technical effects achieved by the specific implementations may refer to the embodiments corresponding to FIG. 5. Descriptions thereof are omitted here.

In these embodiments, the multimedia information is directly sent to the application server, without being forwarded by a terminal, thereby further achieving convenient and quick transmission.

Figure 9:
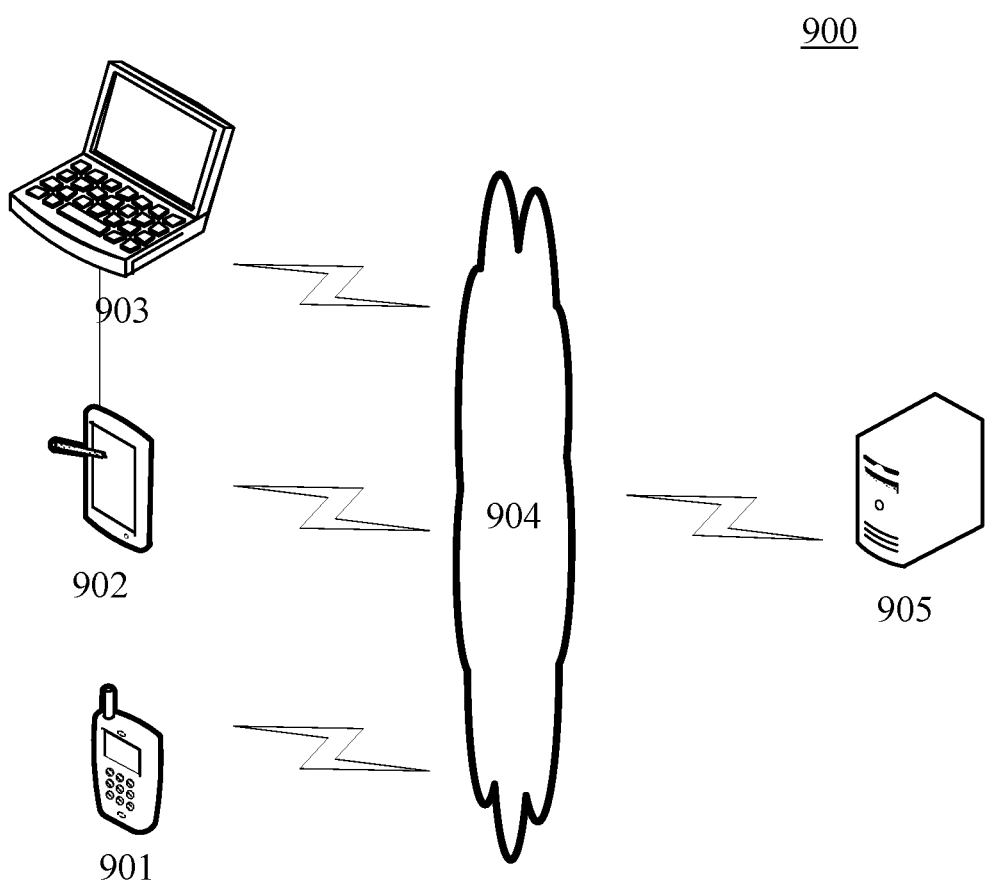
FIG. 9 is an architecture diagram of an exemplary system in which some embodiments of the present disclosure can be applied.

FIG. 9 shows an exemplary architecture 900 capable of applying a video processing method or video processing device in some embodiment of the present disclosure.

As shown in FIG. 9, the system architecture 900 may include terminal devices 901, 902 and 903, network 904 and server 905. The network 904 is a medium used to provide a communication link between the terminal devices 901, 902 and 903 and the server 905. The network 904 may comprise various connection manners such as a wired communication link, a wireless communication link or an optical cable.

The terminal devices 901, 902 and 903 can interact with the server 905 through the network 904 to receive or send messages and the like. Various client applications may be installed on the terminal devices 901, 902 and 903, such as video applications, communication applications, and the like.

The terminal devices 901, 902 and 903 may be hardware or software. When being the hardware, the terminal devices 901, 902 and 903 may be various electronic device having display screen and supporting video display, including, but not limited to a smart phone, a tablet computer, an electronic book reader, a portable laptop computer and a desk computer. When being the software, the terminal devices 901, 902 and 903 may be installed in the electronic device listed as above. The terminal devices 901, 902 and 903 may be implemented as a plurality of software or hardware modules (such as a plurality of software or software modules for providing distributed service) or implemented as a single software or software module, which is not specifically limited herein.

The server 905 may be a server that provides various services, for example, a video server that provides support for video applications installed on the terminal devices 901, 902 and 903. According to actual needs, as an example, the video server may send the corresponding video data to the terminal device in response to the video acquisition request.

It should be noted that, the video processing method provided by the embodiments of the present disclosure is generally executed by the terminal devices 901, 902 and 903. Correspondingly, the video processing apparatus is generally provided in the terminal devices 901, 902 and 903.

It should be noted that the server may be hardware or software. When being the hardware, the server may be implemented as a distributed server cluster composed of a plurality of servers or implemented as a single server. When being the software, the server may be implemented as a plurality of software or software modules (such as a plurality of software or software modules for providing distributed service) or implemented as a single software or software module, which is not specifically limited herein.

It should be understood that the numbers of the terminal device, network and the server in FIG. 9 are merely illustrative. There may be any number of terminal device, network and servers according to an implementation demand. It should be understood that when the target video is stored locally in the terminal device, there may be no network or server.

Figure 10:
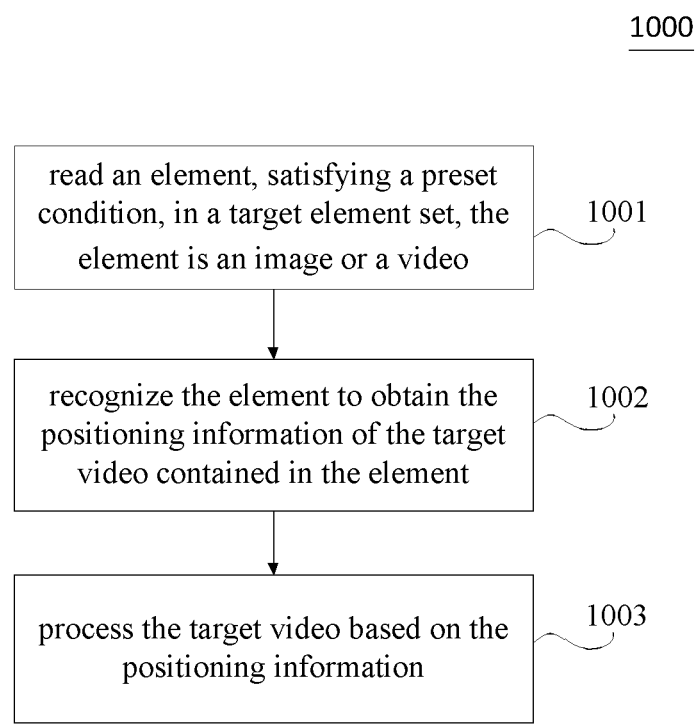
FIG. 10 is a flowchart of some embodiments of a video processing method according to the present disclosure.

Continuing to refer to FIG. 10, a flow 1000 of some embodiments of a video processing method according to the present disclosure is illustrated. The video processing method includes the following steps:

Step 1001, reading an element, satisfying a preset condition, in a target element set, the element is an image or a video.

In some embodiments, an execution subject of the video processing method may be a terminal (for example, terminal devices 901, 902, 903 shown in FIG. 9). The above execution subject can read the element, satisfying a preset condition, in the target element set. The target element set may be any element set. The target element set may be designated or may be screened through certain conditions. In practice, the target element set can be stored on the above execution subject locally. For example, the target element set may be a "photo album". For another example, the target element set may also be a certain folder containing an image or a video. Therefore, the element reading speed can be increased. As needed, the target element set may also be stored in other storage devices in communication connection.

In some alternative implementations, the preset condition may be a condition that defines storage time or a storage address of the element. For example, the preset condition may be a newly stored element. For another example, the preset condition may be an element stored at a certain storage position.

According to different preset conditions, the above execution subject can read elements that satisfy the preset conditions in different ways. Taking the preset condition being the newly stored element as an example, the above execution subject can determine whether an interval between the storage time of the element and the current time is less than a preset time threshold, so as to determine and read the newly stored element.

It should be noted that since the elements in the target element set may be images or videos, the element that satisfies the preset condition may also be an image or a video. As an example, the newly stored element in the "photo album" may be an image or may be a video.

In some alternative implementations, reading an element, satisfying a preset condition, in a target element set includes: reading, in response to detecting a preset operation for a target application, an element, satisfying a preset condition, in the target element set. The preset operation may be various operations. For example, the preset operation may be an operation used for enabling a target application, including but not limited to: clicking, sliding, or the like. For another example, the preset operation may also be switching the target application to a foreground. In practice, various operations can be monitored through an interface provided by a system.

Step 1002, recognizing the element to obtain positioning information of a target video contained in the element.

In some embodiments, the above execution subject can recognize the element read in step 1001 to obtain the positioning information of the target video contained in the element. As an example, whether the element read in step 1001 is an image or a video can be detected first. As an example, the detection can be performed according to the format of the element.

In some alternative implementations, if the element is a video, the execution subject can firstly determine at least one frame of image, satisfying a preset condition, in the video, and the at least one frame of image contains the positioning information of the target video. The preset condition may be various conditions. For example, the preset condition may be the last 2 seconds in the video. On this basis, the above execution subject can recognize at least one frame of image to obtain the positioning information of the target video contained in the at least one frame of image.

In some alternative implementations, the positioning information of the target video may be contained in the at least one frame of image in various forms. As an example, the at least one frame of image may contain a graphic code or character string, and the graphic code or character string contains the positioning information of the target video. The character string may be composed of letters, digits, characters, and the like.

In some alternative implementations, the above execution subject can recognize the graphic code or character string, thereby obtaining the positioning information of the target video contained in the graphic code or character string. The graphic code may be a bar code, a QR code, and the like according to an actual need. The graphic code or character string may be recognized based on a rule used during generation of the graphic code or character string.

Of course, the positioning information of the target video may also be directly contained in at least one frame of image. At this time, the execution subject can recognize the positioning information of the target video contained in the at least one frame of image using optical character recognition (OCR).

If the element is an image, the positioning information may also be contained in the image in various forms. The execution subject can also perform the recognition in different ways according to different methods. The specific recognition method may refer to a method for recognizing at least one frame of image.

Generally, a video stored at a position represented by the positioning information may be determined as the target video. The positioning information of the target video may be information used for indicating a storage position of the target video.

In some alternative implementations, the target video may be a video related to the element, that is, the target video and the element usually have an association relationship. As an example, the element may be generated by cutting the target video. For example, 15 seconds of video are cut from the target video as the related element, or preset frames are cut from the target video to form the related element. In this way, by playing the element or processing the element in other ways, a user can have a preliminary understanding of the content of the target video, the target video acquired according to the positioning information in the element is really the video that the user is interested in, so as to improve the accuracy of information transmission and avoid waste of network resources. As another example, the association relationship may also be that: the element is associated with but does not overlap with the target video in content, or the overlap degree satisfies a predetermined condition, for example, the target video and the element may be different clips cut from the same video, or two videos with the same topics.

In some alternative implementations, the above execution subject can firstly recognize the graphic code or character string contained in at least one frame of image to obtain the information contained in the graphic code or character string. Afterwards, whether the obtained information contains a preset recognition identifier can be determined. On this basis, in response to determining that the obtained information contains the preset recognition identifier, the positioning information of the target video contained in the information is extracted. Recognition of unrelated positioning information can be avoided by means of the preset recognition identifier.

In some alternative implementations, the graphic code further includes at least one of the following: a device code of the terminal that shares the element, and buried point information. Adding the device code of the terminal is convenient for distinguishing contents shared by different terminals. In addition, the element can be tracked by adding the buried point information.

Step 1003, processing the target video based on the positioning information.

In some embodiments, the above execution subject can download and play the target video, or process the target video in other ways based on the positioning information. According to an actual situation, the target video can be stored on the above execution subject locally. At this time, the above execution subject can directly and locally search for and process the target video based on the positioning information.

In some alternative implementations, processing the target video based on the positioning information includes: sending a video acquisition request to a video server in communication connection, the video acquisition request includes positioning information; and receiving and playing video data issued by the video server in response to the video acquisition request. In these implementations, the target video may be stored in the video server.

Figure 11:
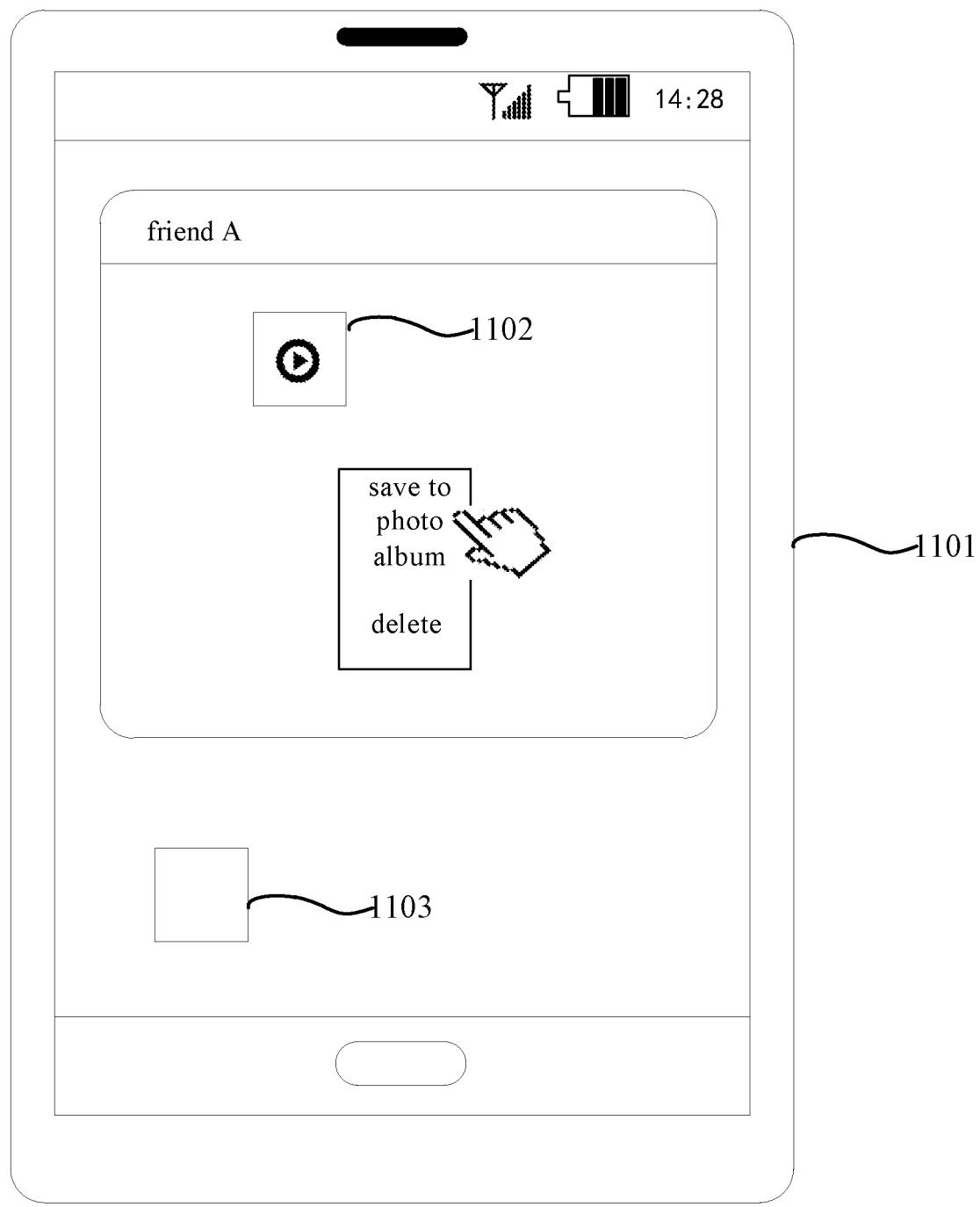
FIG. 11 is a schematic diagram of an application scenario of a video processing method according to some embodiments of the present disclosure.

Referring to FIG. 11, FIG. 11 is a schematic diagram of an application scenario of a video processing method according to some embodiments of the present disclosure. In the application scenario of FIG. 11, an execution subject of the video processing method may be a video processing application 1103 installed in a smart phone 1101. A user can firstly store a video 1102 shared by friend A by means of a communication application in a process of using the smart phone 1101. Therefore, the video 1102 can be viewed in a target element set, such as a "photo album". Therefore, the video processing application 1103 can read an element, satisfying a preset condition, in the target element set, for example, reads a newly stored video, so that the video processing application 1103 reads the video 1102 in the photo album. The positioning information of the target video contained in the last frame of image of the video 1102 is taken as an example. On this basis, the video processing application 1103 can determine the last frame of image of the video 1102. The last frame of image is then subjected to OCR to acquire a plurality of digits contained therein. Afterwards, the plurality of digits are parsed according to a preset parsing rule to obtain the positioning information of the target video, and then the target video is downloaded or played according to the positioning information.

According to the video processing method provided in some embodiments of the present disclosure, the element, satisfying a preset condition, in the target element set is firstly read, and the element is an image or a video. On this basis, the element is recognized to obtain positioning information of the target video contained in the element. Afterwards, the target video is processed based on the positioning information. In this process, the positioning information of the target video is obtained by automatically recognizing the elements, thereby achieving video processing based on the image or video and improving the information processing efficiency.

Figure 12:
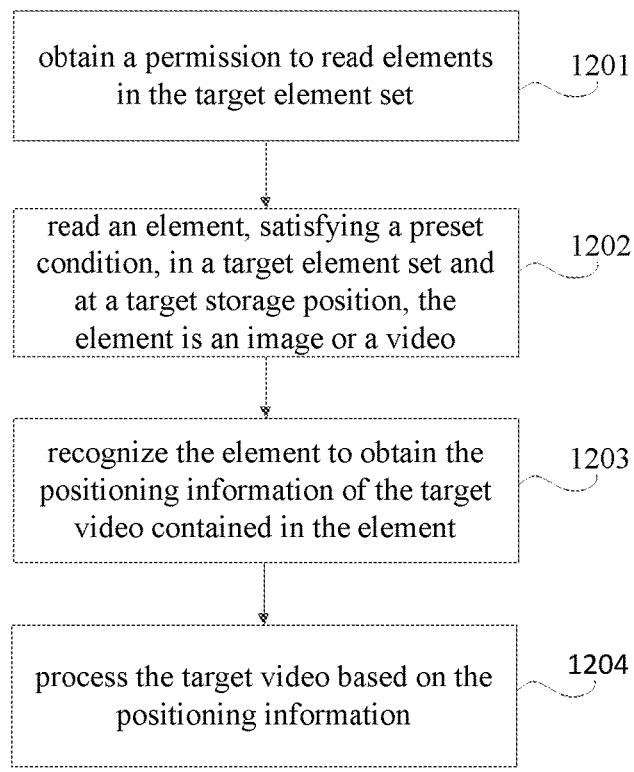
FIG. 12 is a flowchart of some other embodiments of a video processing method according to the present disclosure.

Referring to FIG. 12, a flow 1200 of some other embodiments of a video processing method is illustrated. The video processing flow 1200 includes the following steps:

Step 1201, obtaining a permission to read elements in a target element set.

In some embodiments, an execution subject of the video processing method may obtain the permission to read the elements in the target element set in a variety of ways. As an example, a permission confirm window may be generated or prompt information that the permission is enabled may be displayed. Therefore, the permission to read the elements in the target element set is obtained. In practice, the permission can be obtained during video processing, or may be acquired during application installation, which is not limited here.

Step 1202, reading an element, satisfying a preset condition, in a target element set, the element is an image or a video.

In some embodiments, the specific implementation of step 1202 and technical effects achieved by the implementation may refer to step 1001 in the embodiment corresponding to FIG. 10, and descriptions thereof are omitted here.

Step 1203, recognizing the element to obtain positioning information of a target video contained in the element.

In some embodiments, the specific implementation of step 1203 and technical effects achieved by the implementation may refer to step 1002 in the embodiment corresponding to FIG. 10, and descriptions thereof are omitted here.

Step 1204, processing the target video based on the positioning information.

In some embodiments, the specific implementation of step 1204 and technical effects achieved by the implementation may refer to step 1003 in the embodiment corresponding to FIG. 10, and descriptions thereof are omitted here.

It can be seen from FIG. 12 that compared with the descriptions of some embodiments corresponding to FIG. 10, the permission obtaining step is added in the flow 1200 of the video processing method in some embodiments corresponding to FIG. 12. Therefore, failure of reading the element caused by the lack of permission in some devices is avoided.

Figure 13:
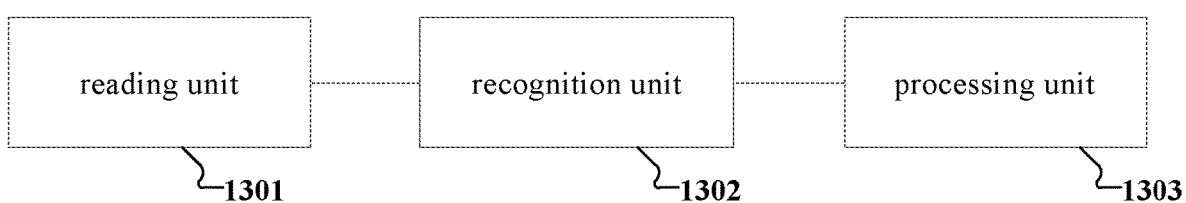
FIG. 13 is a structural schematic diagram of some embodiments of a video processing apparatus according to the present disclosure.

Referring to FIG. 13, as an implementation of the methods shown in the above figures, the present disclosure provides some embodiments of a video processing apparatus. These apparatus embodiments correspond to those method embodiments shown in FIG. 10. The apparatus may be specifically applied to a variety of electronic devices.

As shown in FIG. 13, a video processing apparatus 1300 of some embodiments includes a reading unit 1301, a recognition unit 1302, and a processing unit 1303. The reading unit 1301 is configured to read an element, satisfying a preset condition, in a target element set, the element is an image or a video. The recognition unit 1302 is configured to recognize the element to obtain positioning information of the target video contained in the element. The processing unit 1303 is configured to process the target video based on the positioning information.

In some embodiments, the specific implementations for the reading unit 1301, the recognition unit 1302, and the processing unit 1303 in the video processing apparatus 1300 and technical effects achieved by the specific implementations may refer to those embodiments corresponding to FIG. 10, and descriptions thereof are omitted.

In some alternative implementations, the element is a video. The recognition unit 1302 is further configured to determine at least one frame of image, satisfying a preset condition, in the video, the at least one frame of image contain positioning information of a target video; and recognize the at least one frame of image to obtain the positioning information of the target video contained in the at least one frame of image.

In some alternative implementations, the apparatus 1300 further includes an acquisition unit (not shown in the figure). The acquisition unit is configured to obtain a permission to read elements in a target element set.

In some alternative implementations, the reading unit 1301 is further configured to read, in response to detecting a preset operation for a target application, an element, satisfying a preset condition, in the target element set.

In some alternative implementations, the reading unit 1301 is further configured to read an element, satisfying a condition that an interval between storage time of the element and the current time is less than a preset time threshold, in the target element set.

In some alternative implementations, the processing unit 1303 is further configured to send a video acquisition request to a video server in communication connection, the video acquisition request includes positioning information; and receive and play video data issued by the video server in response to the video acquisition request.

In some alternative implementations, the target video is a video related to the element.

In some alternative implementations, the element is generated by cutting the target video.

In some alternative implementations, the at least one frame of image contains a graphic code or character string, and the graphic code or character string contains the positioning information of the target video.

In some alternative implementations, the recognition unit 1302 is further configured to recognize the graphic code or character string contained in the at least one frame of image to obtain information contained in the graphic code or character string; and extract, in response to determining that the obtained information contains a preset recognition identifier, the positioning information of the target video contained in the information.

In some alternative implementations, the graphic code or character string further includes at least one of the following: a device code of a terminal that shares the element, and buried point information.

In some embodiments, an element, satisfying a preset condition, in a target element set is read first, and the element is an image or a video. On this basis, the element is recognized to obtain positioning information of the target video contained in the element. Afterwards, the target video is processed based on the positioning information. In this process, the positioning information of the target video is obtained by automatically recognizing the element, thereby automatically processing the target video.

Figure 14:
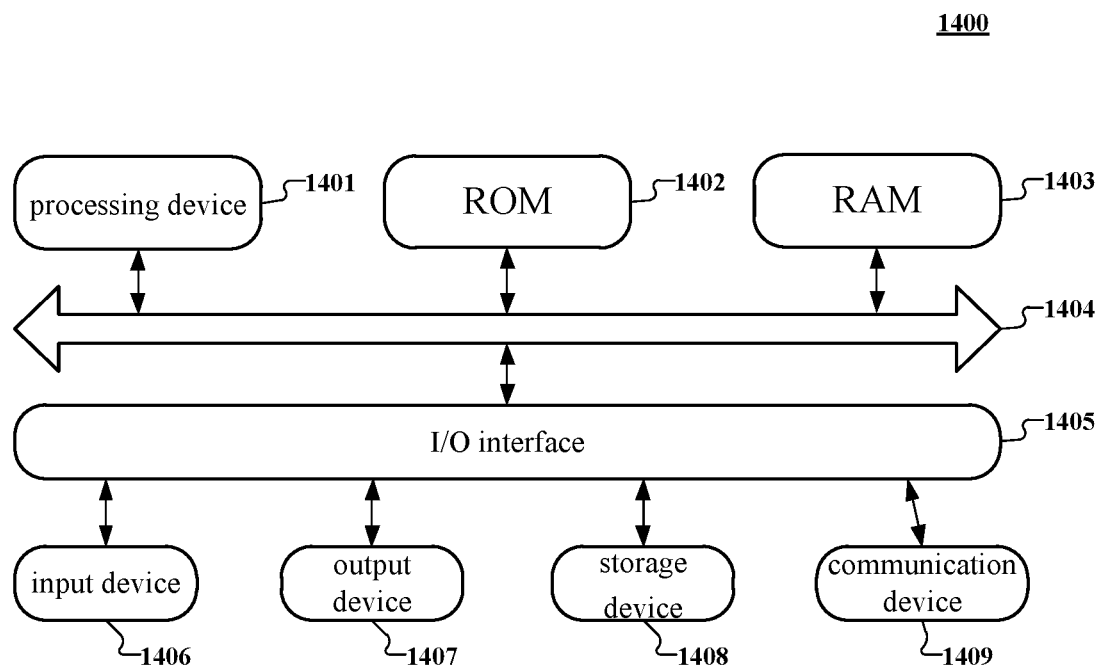
FIG. 14 is a structural schematic diagram of an electronic device applicable to realizing some embodiments of the present disclosure.

Reference is made to FIG. 14 below, which shows a schematic structural diagram of an electronic device (the server or terminal device shown in FIG. 1) 1400 suitable for implementing embodiments of the present disclosure. The terminal devices in some embodiments of the present disclosure may include, but are not limited to, such as mobile phones, notebook computers, digital broadcast receivers, PDAs (personal digital assistants), PADs (tablets), PMPs (portable multimedia players), vehicle-mounted terminals Mobile terminals such as in-vehicle navigation terminals, etc., and stationary terminals such as digital TVs, desktop computers, and the like. The terminal device/server shown in FIG. 14 is only an example, and should not bring any limitation to the functions and scope of use of the embodiments of the present disclosure.

As shown in FIG. 14, the electronic device 1400 may include a processing device (e.g., a central processor, a graphics processor, etc.) 1401 that may perform a variety of suitable actions and processes in accordance with a program stored in a read-only memory (ROM) 1402 or a program loaded from a storage device 1408 into a random access memory (RAM) 1403. In the RAM 1403, various programs and data required for the operation of the electronic device 1400 are also stored. The processing device 1401, the ROM 1402 and the RAM 1403 are connected to each other via a bus 1404. An input/output (I/O) interface 1405 is also connected to the bus 1404.

In general, the following devices may be connected to the I/O interface 1405: an input device 1406 including, for example, a touch screen, a touch pad, a keyboard, a mouse, a camera, a microphone, an accelerometer, a gyroscope, etc.; an output device 1407 including, for example, a liquid crystal display (LCD), a speaker, a vibrator, etc.; a storage device 1408 including, for example, magnetic tape, hard disk, etc.; and a communication device 1409. The communication device 1409 may allow the electronic device 1400 to communicate in a wireless or wired manner with other devices to exchange data. Although FIG. 14 illustrates a electronic device 1400 having a variety of devices, it should be understood that not all illustrated devices are required to be implemented or provided. More or fewer devices may alternatively be implemented or provided. Each block shown in FIG. 14 may represent one device, or may represent multiple devices as required.

Particularly, in accordance with embodiments of the present disclosure, the processes described above with reference to the flowcharts may be implemented as computer software programs. For example, embodiments of the present disclosure include a computer program product comprising a computer program carried on a computer-readable medium, the computer program containing program code for performing the methods shown in the flowchart. In such an embodiment, the computer program may be downloaded and installed from the network via the communication device 1409, or installed from the storage device 1408, or installed from the ROM 1402. When the computer program is executed by the processing device 1401, the above-mentioned functions defined in the method of the embodiments of the present disclosure are performed. It should be noted that the computer storage media described in embodiments of the present disclosure may be computer readable signal media or computer readable storage media or any combination of the two. The computer-readable storage medium may be, for example but not limited to, an electrical, magnetic, optical, electromagnetic, infrared, or semiconductor system, apparatus, or device, or any combination thereof. More specific examples of computer-readable storage media may include, but are not limited to: an electrical connection having one or more wires, a portable computer diskette, a hard disk, a random access memory (RAM), a read only memory (ROM), an erasable programmable read-only memory (EPROM) or flash memory (FLASH), an optical fiber, a compact disc read-only memory (CD-ROM), an optical storage device, a magnetic storage device, or any suitable combination thereof. In some embodiments of the present disclosure, a computer-readable storage medium can be any tangible medium that can contain or store a program for use by or in connection with an instruction execution system, apparatus, or device. In the present disclosure, a computer-readable signal medium may include a data signal that propagates in baseband or as part of a carrier wave, carrying computer-readable program code. Such propagated data signals may take many forms, including but not limited to electromagnetic signals, optical signals, or any suitable combination thereof. The computer-readable signal medium may also be any computer-readable medium other than the computer-readable storage medium that can transmit, propagate, or transport the program for use by or in connection with the instruction execution system, apparatus, or device. The program code embodied on the computer-readable medium may be transmitted using any suitable medium including, but not limited to: wire, fiber optic cable, radio frequency (RF), and the like, or any suitable combination thereof.

The computer-readable medium can be contained in the electronic device; it may also be separate and not assembled into the electronic device. The computer-readable medium carries one or more programs which, when executed by the electronic device, cause the electronic device: in response to detecting the user's transmission operation for the target video, obtain multimedia information corresponding to the target video, and the multimedia information carries the positioning information of the target video; in response to receiving information for performing the transmission, sending the multimedia information to the application server corresponding to the application for transmitting the target video, wherein the information for performing the transmission includes the identification information of the application; or in response to receiving the transmission request for the target video sent by the first terminal, obtaining a video or image corresponding to the target video; add the positioning information of the target video to the video or image to obtain multimedia information corresponding to the target video; sending the multimedia information to the first terminal; or in response to receiving the transmission request for the target video, the multimedia information corresponding to the target video is obtained, and the transmission request includes the identification information of the application for transmitting the target video, wherein the multimedia information carries the positioning information of the target video; the multimedia information is sent to the application server corresponding to the application, and the application server distributes the target video based on the multimedia information.

Computer program code for carrying out operations of the present disclosure may be written in one or more programming languages, including object-oriented programming languages such as Java, Smalltalk, C++, and conventional procedural programming languages such as the "C" language or similar programming languages. The program code may execute entirely on the user's computer, partially on the user's computer, as a stand-alone software package, partially on the user's computer, partially on a remote computer, or entirely on a remote computer or server. In the case of a remote computer, the remote computer may be connected to the user computer through any kind of network, including a local area network (LAN) or a wide area network (WAN), or may be connected to an external computer (e.g., through the Internet using an Internet service provider).

The flowcharts and block diagrams in the drawings illustrate the architecture, functionality, and operation of possible implementations of systems, methods, and computer program products in accordance with various embodiments of the present disclosure. In this regard, each block of the flowcharts or block diagrams may represent a module, segment, or portion of code, which comprises one or more executable instructions for implementing the specified logical function (s). It should also be noted that in some alternative implementations, the functions noted in the blocks may occur out of the order noted in the figures. For example, two blocks shown in succession may, in fact, be executed substantially concurrently or they may sometimes be executed in the reverse order, depending upon the functionality involved. It is also noted that each block of the block diagrams and/or flowchart illustrations, and combinations of blocks in the block diagrams and/or flowchart illustrations, can be implemented by special purpose hardware-based systems which perform the specified functions or operations, or combinations of special purpose hardware and computer instructions.

The units described in the embodiments of the present disclosure may be implemented in software or in hardware. The described unit can also be provided in the processor, for example, it can be described as: a processor includes a acquiring unit and a sending unit. Among them, the names of these units do not constitute a limitation on the unit itself under certain circumstances. For example, the acquiring unit can also be described as "the unit acquiring the multimedia information corresponding to the target video in response to detecting the user's transmission operation for the target video".

The foregoing description is only illustrative of the embodiments of the present disclosure and the technical principles employed. It should be understood by those skilled in the art that the scope of the disclosure referred to in this disclosure is not limited to the particular combination of features described above, but is intended to cover other embodiments which may be formed by any combination of features described above or their equivalents without departing from the spirit of the disclosure. For example, the above-mentioned features are mutually replaced with technical features disclosed in the present disclosure (but not limited to) having similar functions to form a technical solution.

What is claimed is:

1. A method for multimedia processing, comprising:
   detecting a transmission request of transmitting a target video to a target terminal device associated with a target user, wherein the transmission request comprises identification information of the target user;
   acquiring a first multimedia information corresponding to the target video in response to detecting the transmission request, wherein the first multimedia information is generated based on the target video by a multimedia server, and wherein the first multimedia information carries positioning information of the target video;
   displaying a plurality of representations corresponding to a plurality of communication applications;
   identifying one of the plurality of communication applications in response to selecting one of the plurality of representations corresponding to the one of the plurality of communication applications; and
   sending the first multimedia information to an application server corresponding to the one of the plurality of communication applications, wherein the application server distributes the first multimedia information to the target terminal device.

2. The method according to claim 1, wherein the sending the first multimedia information to the application server corresponding to the application comprises:
sending the first multimedia information and the identification information of the target user to the application server corresponding to the application used for processing the target video, wherein the identification information of the target user is used for instructing the application server to send the first multimedia information to the target terminal device corresponding to the target user to enable the target terminal device to process the target video based on the positioning information.

3. The method according to claim 2, further comprising:
sending, by the application server, the first multimedia information to the target terminal device corresponding to the target user;
storing the first multimedia information in a target element set by means of the target terminal device corresponding to the target user;
reading an element, satisfying a preset condition, in the target element set, the element is a multimedia information;
recognizing the element to obtain the positioning information of the target video contained in the element; and
processing the target video based on the positioning information.

4. The method according to claim 1, wherein acquiring the first multimedia information corresponding to the target video comprises:
sending a multimedia processing request to a multimedia server in communication connection in response to detecting the processing operation of the user for the target video; and
receiving the first multimedia information corresponding to the target video issued by the multimedia server in response to the multimedia processing request, wherein the first multimedia information corresponding to the target video is pre-generated by the multimedia server, or is generated in response to receiving the multimedia processing request sent by a terminal; or
sending a multimedia processing request to a multimedia server in communication connection in response to detecting the processing operation of the user for the target video;
receiving a multimedia information corresponding to the target video issued by the multimedia server in response to the multimedia processing request; and adding the positioning information of the target video to the received multimedia information to obtain the first multimedia information corresponding to the target video.

5. The method according to claim 4, wherein the multimedia information corresponding to the target video and the target video satisfy the following relationship:
a multimedia information with a fixed duration is cut from the target video as the multimedia information corresponding to the target video, or
a preset frame of multimedia information in the target video is taken as the corresponding multimedia information;
the multimedia information corresponding to the target video and the target video are different clips cut from the same piece of multimedia information, or
the multimedia information corresponding to the target video and the target video are two pieces of multimedia information with the same topics.

6. The method according to claim 1,
wherein the element is a video; and
wherein recognizing the element to obtain the positioning information of the target video contained in the element comprises:
determining at least one frame of image, satisfying the preset condition, in the video, the at least one frame of image contains the positioning information of the target video; and
recognizing the at least one frame of image to obtain the positioning information of the target video contained in the at least one frame of image.

7. The method according to claim 3, wherein before reading the element, satisfying the preset condition, in the target element set, the method further comprises:
obtaining a permission to read elements in the target element set;
wherein reading the element, satisfying the preset condition, in the target element set comprises:
reading the element, satisfying the preset condition, in the target element set, in response to detecting a preset operation for a target application; or
reading an element whose storage time or storage address satisfies the preset condition in the target element set according to storage time or storage addresses of the elements in the target element set.

8. The method according to claim 3, wherein processing the target video based on the positioning information comprises:
sending a multimedia acquisition request to a multimedia server in communication connection, wherein the multimedia acquisition request comprises the positioning information; and
receiving and playing a multimedia data issued by the multimedia server in response to the multimedia acquisition request.

9. The method according to claim 6, wherein the at least one frame of image contains a graphic code or character string, and the graphic code or character string contains the positioning information of the target video;
wherein recognizing the at least one frame of image to obtain the positioning information of the target video contained in the at least one frame of image comprises:
recognizing the graphic code or character string contained in the at least one frame of image to obtain information contained in the graphic code or character string; and
extracting the positioning information of the target video contained in the information in response to determining that the obtained information comprises a preset recognition identifier.

10. A method for multimedia processing, comprising:
detecting a request of transmitting a target video to a target terminal device associated with a target user, wherein the request comprises identification information of the target user;
acquiring a first multimedia information corresponding to the target video in response to receiving the request, wherein the first multimedia information is generated based on the target video by a multimedia server, and wherein the first multimedia information carries positioning information of the target video;
displaying a plurality of representations corresponding to a plurality of communication applications;
identifying one of the plurality of communication applications in response to selecting one of the plurality of representations corresponding to the one of the plurality of communication applications; and sending the first multimedia information to an application server corresponding to the one of the plurality of communication applications, wherein the application server distributes the first multimedia information to the target terminal device.

11. The method according to claim 10,
wherein the processing request further comprises identification information of a target user; and
wherein sending the first multimedia information to the application server corresponding to the application comprises:
sending the first multimedia information and the identification information of the target user to the application server corresponding to the application, the identification information is used for instructing the application server to send the first multimedia information to a target terminal device corresponding to the target user, and
sending, by the application server, the first multimedia information to the target terminal device corresponding to the target user.

12. The method according to claim 10, wherein acquiring the first multimedia information corresponding to the target video comprises:
acquiring a multimedia information corresponding to the target video; and adding the positioning information of the target video to the multimedia information to obtain the first multimedia information corresponding to the target video; or
acquiring a multimedia information corresponding to the target video; and adding the positioning information of the target video to the multimedia information to obtain the first multimedia information corresponding to the target video;
wherein the first multimedia information corresponding to the target video is generated based on the target video;
wherein the multimedia comprises a video.

13. A method for multimedia processing, comprising:
reading an element, satisfying a preset condition, in a target element set, the element is a multimedia information, wherein the multimedia information is generated based on a target video by a multimedia server, wherein the multimedia information is acquired in response to detecting a transmission request of transmitting the target video, wherein the multimedia information carries positioning information of the target video, wherein the multimedia information is sent from an application server corresponding to one of a plurality of communication applications, and wherein the one of the plurality of communication applications is determined in response to selecting one of a plurality of representations corresponding to the one of the plurality of communication applications;
recognizing the element to obtain the positioning information of the target video contained in the element;
processing the target video based on the positioning information; and
wherein the target video is a video related to the element.

14. The method according to claim 13,
wherein the element is a video; and
wherein recognizing the element to obtain the positioning information of the target video contained in the element comprises:
determining at least one frame of image, satisfying the preset condition, in the video, the at least one frame of image contain the positioning information of the target video;
recognizing the at least one frame of image to obtain the positioning information of the target video contained in the at least one frame of image; and
wherein the multimedia comprises a video or an image.

15. The method according to claim 13, wherein before reading the element, satisfying the preset condition, in the target element set, the method further comprises:
obtaining a permission to read elements in the target element set;
wherein reading the element, satisfying the preset condition, in the target element set comprises:
reading the element, satisfying the preset condition, in the target element set, in response to detecting a preset operation for a target application; or
reading an element whose storage time or storage address satisfies the preset condition in the target element set according to storage time or storage addresses of the elements in the target element set.

16. The method according to claim 13, wherein processing the target video based on the positioning information comprises:
sending a multimedia acquisition request to a multimedia server in communication connection, the multimedia acquisition request comprises the positioning information; and
receiving and playing a multimedia data issued by the multimedia server in response to the multimedia acquisition request.

17. The method according to claim 13, wherein the element is generated by cutting the target video;
wherein the element and the target video satisfy the following relationship:
a multimedia information with a fixed duration is cut from the target video as the element, or
a preset frame of multimedia information in the target video is taken as the element.

18. The method according to claim 14, wherein the at least one frame of image contains a graphic code or character string, and the graphic code or character string contains the positioning information of the target video;
wherein recognizing the at least one frame of image to obtain the positioning information of the target video contained in the at least one frame of image comprises:
recognizing the graphic code or character string contained in the at least one frame of image to obtain an information contained in the graphic code or character string; and
extracting the positioning information of the target video contained in the information in response to determining that the obtained information contains a preset recognition identifier.

19. The method according to claim 13, wherein reading the element, satisfying the preset condition, in the target element set comprises:
reading an element, satisfying the preset condition, in a locally stored target element set.

20. A non-transitory computer-readable medium, which stores a computer program, wherein the program, when executed by a processor, cause the processor to implement operations comprising:
detecting a transmission request of transmitting a target video to a target terminal device associated with a target user, wherein the transmission request comprises identification information of the target user;
acquiring a first multimedia information corresponding to the target video in response to detecting the transmission request, wherein the first multimedia information is generated based on the target video by a multimedia server, and wherein the first multimedia information carries positioning information of the target video;

displaying a plurality of representations corresponding to a plurality of communication applications;

identifying one of the plurality of communication applications in response to selecting one of the plurality of representations corresponding to the one of the plurality of communication applications; and sending the first multimedia information to an application server corresponding to the one of the plurality of communication applications, wherein the application server distributes the first multimedia information to the target terminal device.

* * * * *